US007940998B2

(12) United States Patent  
Döerrer (10) Patent No.: US 7,940,998 B2  
(45) Date of Patent: May 10, 2011

(54) SYSTEM AND METHOD FOR RE-LOCATING AN OBJECT IN A SAMPLE ON A SLIDE WITH A MICROSCOPE IMAGING DEVICE (75) Inventor: Rainer Döerrer, Müllheim (DE)

(73) Assignee: Tripath Imaging, Inc., Burlington, NC (US)

( * ) Notice: Subject to any disclaimer, the term of this patent is extended or adjusted under 35 U.S.C. 154(b) by 759 days.

(21) Appl. No.: 11/423,464

(22) Filed: Jun. 12, 2006

(65) Prior Publication Data  
US 2007/0076983 A1     Apr. 5, 2007

Related U.S. Application Data (60) Provisional application No. 60/689,825, filed on Jun. 13, 2005.

(51) Int. Cl.  
*G06K 9/36* (2006.01)

(52) U.S. Cl. ........ 382/286; 382/295; 382/133; 382/181; 382/294; 382/291; 382/209; 382/216; 382/217; 382/218; 382/219

(58) Field of Classification Search ................. 382/295, 382/133, 181, 216–219, 244, 209, 291, 286  
See application file for complete search history.

(56) References Cited

U.S. PATENT DOCUMENTS

| | | |
|---|---|---|
| 5,790,308 A | 8/1998 | Kamentsky |
| 5,793,969 A | 8/1998 | Kamentsky et al. |
| 5,885,840 A * | 3/1999 | Kamentsky et al. ............ 436/63 |
| 6,006,140 A * | 12/1999 | Carter ............................. 700/56 |
| 6,259,807 B1 * | 7/2001 | Ravkin .......................... 382/133 |
| 6,327,377 B1 | 12/2001 | Rutenberg et al. |
| 6,396,941 B1 * | 5/2002 | Bacus et al. .................. 382/128 |
| 6,489,625 B1 | 12/2002 | Takahashi |
| 6,711,283 B1 * | 3/2004 | Soenksen ...................... 382/133 |

(Continued)

FOREIGN PATENT DOCUMENTS

EP     1 085 292 A1     3/2001

(Continued)

OTHER PUBLICATIONS

John Russ, The Image Processing Handbook, CRC Press 2002.*

(Continued)

*Primary Examiner* — Wesley Tucker  
*Assistant Examiner* — Mark Roz  
(74) *Attorney, Agent, or Firm* — Alston & Bird LLP (57) ABSTRACT A method of re-locating an object in a sample is provided for a previously-scanned slide having determined objects each with corresponding stored coordinates and a stored image, the objects being mapped relative to each other. The slide is positioned on a microscope stage, stored images of the objects are visually displayed, and a target object is selected. The slide is moved to an estimated coordinate position, corresponding to the coordinates of the target object, and a field-of-view image of the sample is captured for comparison to the stored image of the target. If the target is in the image, an offset between actual coordinates of the located target and the stored coordinates of the corresponding object is determined. The slide is then moved, via the stage, from the estimated coordinate position, according to the offset, to center the target in the image. Associated systems and methods are also provided.

40 Claims, 4 Drawing Sheets

U.S. PATENT DOCUMENTS

| | | | |
|---|---|---|---|
| 7,518,652 B2* | 4/2009 | Olson et al. | 348/351 |
| 2002/0085744 A1* | 7/2002 | Domanik et al. | 382/133 |
| 2002/0090127 A1* | 7/2002 | Wetzel et al. | 382/133 |
| 2003/0012420 A1* | 1/2003 | Verwoerd et al. | 382/133 |
| 2003/0091221 A1 | 5/2003 | Marcelpoil et al. | |
| 2003/0112330 A1* | 6/2003 | Yuri et al. | 348/80 |
| 2003/0138140 A1 | 7/2003 | Marcelpoil et al. | |
| 2003/0179445 A1 | 9/2003 | Maenle et al. | |
| 2003/0210262 A1 | 11/2003 | Gahm et al. | |
| 2005/0281484 A1* | 12/2005 | Perz et al. | 382/294 |
| 2006/0077538 A1 | 4/2006 | Zahniser et al. | |
| 2009/0002811 A1* | 1/2009 | Uchiyama et al. | 359/383 |

FOREIGN PATENT DOCUMENTS

JP    07333517    12/1995

OTHER PUBLICATIONS

Bentley, Optimal Expected-Time Algorithms for Closest Point Problems, ACM 1980.*

\* cited by examiner

SYSTEM AND METHOD FOR RE-LOCATING AN OBJECT IN A SAMPLE ON A SLIDE WITH A MICROSCOPE IMAGING DEVICE

CROSS-REFERENCE TO RELATED APPLICATIONS

This application claims the benefit of U.S. Provisional Application No. 60/689,825, filed Jun. 13, 2005, which is incorporated by reference herein in its entirety.

BACKGROUND OF THE INVENTION

1. Field of the Invention

The present invention relates to a system and method for re-locating an object in a sample on a previously-examined slide with a microscope imaging device.

2. Description of Related Art

Microscopic analysis is a widely used tool for research and routine evaluations, particularly in the field of cellular biology, cytology and pathology. Tissue samples and cell preparations are visually inspected by pathologists under several different conditions and test procedures, through the use of a microscope. Based on such a visual inspection by the pathologist, determinations concerning the tissue or cellular material can be made. For example, in cancer detection and research, microscopic analysis aids in the detection and quantification of genetic alterations and/or anomalies that appear related to the cause and progression of cancer, such as changes of expression of specific genes in form of DNA or messenger RNA (gene amplification, gene deletion, gene mutation), or the encoded protein expression. These alterations/anomalies can either be assessed in microscopic slides specifically prepared to present individual cells, as is the standard procedure in cytology, or whole histological sections or Tissue Micro Arrays can be evaluated.

Although numerous other suitable laboratory techniques or analyses exist, microscopy is routinely used because it is an informative technique, allowing rapid investigations at the cellular and sub-cellular levels, while capable of being expeditiously implemented at a relatively low cost. However, in order to overcome, for example, subjectivity and/or repeatability limitations of conventional microscopy, improved analysis devices combine the microscope with automatic image analysis provisions. Such improved devices include, for example, interactive systems, automatic scanning devices, and virtual slide scanners.

Interactive systems usually don't change the workflow of the pathologist analyzing and interpreting slides underneath the microscope. Typically, such interactive systems allow the potential for extracting additional quantitative information from the slide via image analysis and, therefore, possibly improve the reproducibility and the interpretation results of the operator. Better tools for reporting and documenting analysis results may also be realized. If properly configured, interactive systems are relatively fast and cost efficient, but the impact of such interactive systems on routine workflow is relatively small.

Automatic rare event detection devices are typically set up in a way that the whole analysis of the slides is done by the system in a totally unsupervised manner, from the loading of the slides onto the scanning stage to the final reporting of the results. Such automatic systems usually scan the slides, automatically identify objects or areas of interest for the analysis, quantitatively assess the targets, and report and document the results. The routine workflow for the pathologist or cytotechnologist in general is changed drastically, from a labor-intensive screening task to the interpretation of analysis results. However, such automatic systems are normally quite expensive, so that a relatively high annual volume of slides must be processed to cost-justify the acquisition of such a device.

Virtual slide scanning systems have been developed to automatically acquire large overview images at different optical resolutions. Such overview images can be far larger than the individual FOVs as they can be seen in the microscope.

One common device-independent factor relating these three applications mentioned above, namely interactive systems, automatic scanning devices, and virtual slide scanners, is that there may be instances in which the previously scanned, imaged, and/or otherwise analyzed slide must be physically re-examined by an operator. In such instances, the operator is faced with the task of re-locating an object of interest in the sample on the slide, wherein such an object of interest was discovered in the previous analysis of that slide. To compound the task, the operator may, in some instances, be using a different microscope imaging device from the microscope imaging device or other apparatus that was previously used to scan, image, and/or analyze that slide. In some instances, the magnification used to previously image or analyze the slide may not be known, and the device used by the operator may have a different resolution, both in terms of imaging capacity as well as in terms of movement provision of the device components.

In a typical method of re-locating an object in a sample on a slide, one or more re-location marks are designated and located on the slide, and these marks stored as reference coordinates, prior to the slide being scanned or otherwise imaged. During the slide scanning procedure, one or more images of the slide or objects within the sample on the slide are captured and stored, possibly with coordinate values that are determined relative to the relocation marks. Before reviewing or otherwise attempting to re-locate an object on the slide, one or more of the re-location marks must be found on the physical slide. If the appropriate functionality is provided, the operator may be allowed to select a desired object of interest from a visual display of objects of interest in the sample, at which time the stage moves to an expected or estimated location where the selected object should be within the field of view. However, the operator may have to subjectively identify whether the object at the expected location is the same as the object selected by the operator. The operator also must often manually correct the stage position if the displayed object is off-center with respect to the field of view. In addition, if the selected object is not displayed or cannot be otherwise identified in the field of view at the expected position, then the operator generally must manually find the object. However, once a manual search procedure is invoked by the operator, any coordinate calibration is usually lost and any objects later selected for review will require the same time-consuming manual relocation procedure to be performed by the operator.

As such, typical re-location methods often require specific slides having precision marks particularly for the re-location procedure. Further, expensive high-precision (typically in the micron range) motorized stages are often necessary for capturing and/or re-locating objects on the slide so as to maintain sufficient reproducibility with respect to the previously-scanned image over the entire extent of the slide. Prior to scanning the slide, the re-location marks or other parameters must be established by physically finding those marks on the slide, wherein such re-location marks again have to be found prior to reviewing the slide so as to re-locate objects of interest. If the re-location methodology is not sufficiently accurate, the location of a selected object may have to be manually corrected to bring that object into proper position in the field of view. Also, locating one object generally does little if anything to improve the re-location precision for subsequently-selected objects of interest on that slide. Still further, re-location precision is dependent on the precision of the scanning stage, as well as the precision of the review stage, and may also be affected by the preciseness of the determination of the re-location marks during both the scanning and re-location procedures.

Thus, there exists a need for a method and apparatus for rapid and efficient re-location of an object of interest in a sample on a previously-scanned microscope slide under a microscope imaging device, wherein minimal, if any, manual intervention of the operator is required, particularly where the microscope stage is motorized and the microscope thus capable of automatically performing most if not all re-location functions. Such a method and apparatus should desirably be capable of re-locating the object whether or not the slide was scanned by that device or a different device. Such an apparatus and method should desirably be relatively cost effective, have relatively little and/or simple equipment requirements, and be readily adaptable to various magnifications.

BRIEF SUMMARY OF THE INVENTION

The above and other needs are met by the present invention which, in one embodiment, provides a method of re-locating an object of interest in a sample on a slide as viewed through a microscope objective. Such a method comprises scanning the slide so as to determine objects of interest in the sample, associating corresponding coordinates with each object of interest, and storing an image and corresponding coordinates of each object of interest. The objects of interest are mapped relative to each other via the coordinates. The slide is then positioned on a microscope stage, and the stored images of the objects of interest are displayed on a visual display. A first target object of interest is selected from the displayed stored images of the objects of interest. The slide is moved, via the microscope stage, to a first estimated coordinate position on the slide corresponding to the coordinates of the first target object of interest. A field-of-view image of the sample at the first estimated coordinate position through the microscope objective. The field-of-view image is then compared to the stored image of the first target object of interest and, if the first target object of interest is located in the field-of-view image, a first offset between actual coordinates of the located first target object of interest and the stored coordinates of the object of interest corresponding to the first target object of interest is determined. The slide is then moved, via the microscope stage, from the first estimated coordinate position and according to the first offset so as to center the first target object of interest in the field-of-view image.

Another aspect of the present invention comprises a method of re-locating an object of interest in a sample on a slide on a microscope stage, with the slide having been previously scanned so as to determine objects of interest in the sample, and wherein corresponding coordinates have been associated with each object of interest, an image and corresponding coordinates of each object of interest have been stored, and the objects of interest mapped relative to each other via the coordinates. Such a method comprises displaying the stored images of the objects of interest on a visual display, and selecting a first target object of interest from the displayed stored images of the objects of interest. The slide is then moved, via the microscope stage, to a first estimated coordinate position on the slide corresponding to the coordinates of the first target object of interest. A field-of-view image of the sample at the first estimated coordinate position through a microscope objective. The field-of-view image is compared to the stored image of the first target object of interest and, if the first target object of interest is located in the field-of-view image, a first offset between actual coordinates of the located first target object of interest and the stored coordinates of the object of interest corresponding to the first target object of interest, is determined. The slide is then moved, via the microscope stage, from the first estimated coordinate position and according to the first offset so as to center the first target object of interest in the field-of-view image.

Another aspect of the present invention comprises a method of re-locating an object of interest in a sample on a slide on a microscope stage, with the slide having been previously scanned so as to determine objects of interest in the sample, and wherein corresponding coordinates have been associated with each object of interest, an image and corresponding coordinates of each object of interest have been stored, and the objects of interest mapped relative to each other via the coordinates. Such a method comprises displaying the stored images of the objects of interest on a visual display, and selecting a first target object of interest from the displayed stored images of the objects of interest. The slide is moved, via the microscope stage, to a first estimated coordinate position on the slide corresponding to the coordinates of the first target object of interest. A field-of-view image of the sample at the first estimated coordinate position viewed through a microscope objective is manually compared to the stored image of the first target object of interest and, if the first target object of interest is located in the field-of-view image, a first offset between actual coordinates of the located first target object of interest and the stored coordinates of the object of interest corresponding to the first target object of interest, is determined. The slide is then moved, via the microscope stage, from the first estimated coordinate position and according to the first offset so as to center the first target object of interest in the field-of-view image.

Suitable apparatuses for implementing and accomplishing the disclosed methods are also provided, wherein many different apparatus configurations and arrangements may be used, as will be appreciated by one skilled in the art. Accordingly, embodiments of the present invention provide distinct advantages as described and further discussed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the present invention are directed to methods for re-locating an object in a sample on a previously-examined slide with a microscopy imaging device. In order to carry out such methods, one embodiment of the present invention implements a system 50 as shown, for example, in FIG. 1, that includes a microscope 100 with built-in automation functionalities (e.g., a Zeiss AxioImager), a motorized stage 150 for the microscope 100 that can be controlled by a computer device 300 or manually operated by an operator (alternatively, the motorized stage 150 may comprise, for example, a manually-positionable stage configured and/or encoded to move according to a calibrated x-y or other appropriate coordinate system), and a camera device 200 such as a progressive area scan camera (e.g., a CCD or a CMOS type camera). The motorized microscope stage 150 may be in communication with a computer device 300 having a visual display 325, while the camera device 200 may also in communication with the computer device 300 via, for instance, a digitizer or a frame-grabber device. The system 50 is configured to receive, on the stage 150, a slide 350 having a sample associated therewith, wherein the sample/slide 350 has been previously scanned by an imaging device and any objects of interest located within the sample as a result of such scan stored as individual images. The individual images may be stored, for example, on portable media or on the hard drive of or other storage system associated with the computer device 300.

Figure 1:
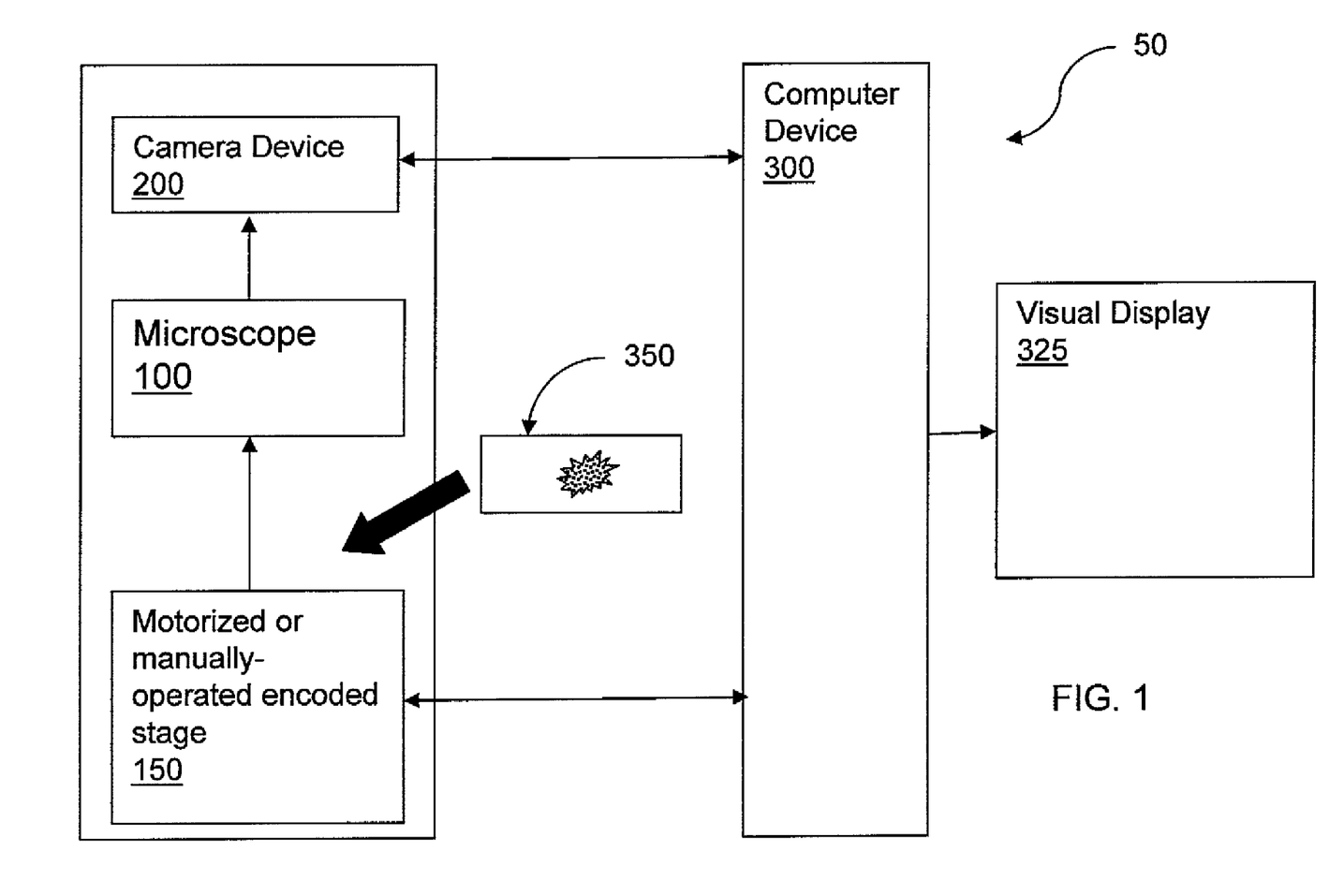
FIG. 1 schematically illustrates an apparatus for re-locating an object of interest on a previously-scanned slide under a microscope, according to one embodiment of the present invention.

Such images of the objects of interest may be obtained via the system 50 or via any other suitable imaging system capable of identifying and imaging the objects of interest. However, the system 50 is particularly configured to re-locate the objects of interest on the slide 350, whether the slide 350 is moved to the system 50 from the other imaging system, or whether the slide 350 is removed from the system 50 after imaging and then replaced on the stage 150 at a later time for further examination. One skilled in the art will note, however, that the methods described herein may be equally applicable where the slide 350 has moved with respect to the stage 150, or where the operator desires to verify the orientation/alignment of the slide 350 with respect to the as-imaged condition.

The computer device 300 is further configured to host and execute one or more databases, with such databases including the images of objects of interest from examined or scanned samples/slides. In addition, coordinates, such as Cartesian coordinates or coordinates in any other suitable coordinate system, of the stored objects of interest with respect to a reference point on the slide are determined and stored in association with the respective image (also referred to herein as the "scan coordinates" of an image in a "scan coordinate system"). The reference point may be any suitable feature present on the slide such as, for example, one of the slide corners or a well-defined fiducial on the slide. In some instances, the reference point itself may be saved as one of, or with, the objects of interest for the scanned slide. In the alternative, the coordinate system may be established or otherwise associated with a calibration of the microscope stage 150, such that the stored images are associated with coordinates relative to the stage coordinate system When the slide 350 is placed on the stage 150 of the system 50 for further examination, embodiments of the present invention are directed to allowing any of the previously imaged objects of interest of a specimen, such as a biological specimen, to be re-located on the slide 350 by an operator under the microscope 100 by selecting the image of that object of interest from the previously-scanned digital images of the objects of interest on the slide as presented to the operator on the visual display 325. Prior to the slide 350 being placed on the stage 150, however, the microscope stage 150 is first calibrated to establish a current coordinate system (which may be the same as the stage coordinate system established in the slide scanning phase, if using the same system 50, or different from the stage coordinate system of the slide scanning phase if the system 50 is different from the scanner). Such a "current" coordinate system is also referred to herein in terms of "stage coordinates" with respect to a "stage coordinate system." When the slide 350 is first placed on the stage 150 and an object of interest 330 is selected from the visual display 325 by the operator (the "first object of interest"), the system 50 automatically determines and calibrates coordinate system parameters for the stage coordinate system of the stage 150, wherein the stage 150 may interact with the computer device 300 to perform such a calibration. Typically, no action by the operator is required, though gross misalignments or other problems that may occur during the procedure could be reported to the operator via the computer device 300, where necessary, for manual correction. When the stage coordinate system for the stage 150 has been calibrated, the camera device 200 continuously provides an image of the field of view ("FOV") 340 of the sample seen by the microscope 100 to the computer device 300.

Figure 2:
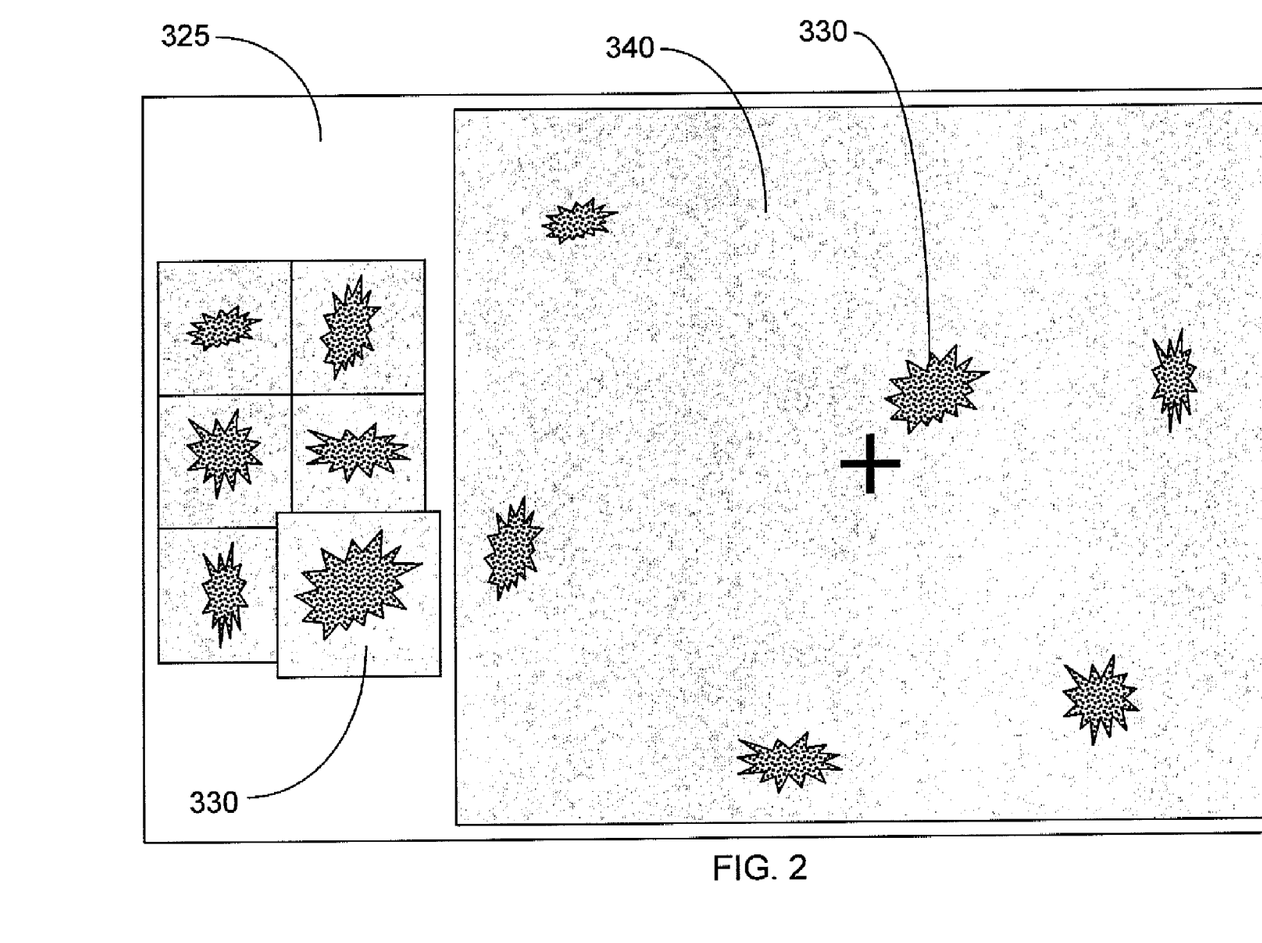
FIG. 2 schematically illustrates a visual display of previously-scanned objects of interest displayed alongside an FOV image on a visual display, according to one embodiment of the present invention.

The computer device 300 can, in some instances, continuously displays the FOV image 340 on the visual display 325. The previously-scanned images of the objects of interest 330 associated with that slide 350 may also be displayed alongside the FOV image 340 on the visual display 325, or otherwise visually provided to the operator, as shown, for example, in FIG. 2. Along with the FOV image 340, the computer system 300, from the calibrated stage coordinate system, estimates or otherwise determines a current position of the FOV with respect to the slide 350. That is, if a slide 350 engages the stage 150 at a known position on the stage 150, and the movement of the stage 150 is correlated to a change in coordinates on that slide 350 from the known position, then for any slide placed on the calibrated stage, an approximate current position of the FOV with respect to the slide can be determined from the position of the stage 150 via the stage coordinate system.

Even though the approximate current position of the FOV with respect to the slide 350 can be determined, the stage coordinate system does not necessarily correspond to the scan coordinate system associated with the previously-scanned slide. Further, the object of interest information associated with the slide 350, as previously discussed, is associated with the scan coordinate system. As such, when the desired first object of interest image is selected by the operator from the visual display 325, or from another visual display device (not shown), the stored coordinates for that first object of interest are associated with the scan coordinate system. The system 50 must therefore reconcile the scan coordinate system with the stage coordinate system so as to re-locate that first object of interest in the FOV shown on the visual display 325. Accordingly, since the approximate current position of the FOV is known with respect to the slide 350 from the stage coordinate system, the system 50 is configured to move the slide 350 to an estimated coordinate position of the FOV, corresponding to the coordinates of the selected first object of interest transferred into the stage coordinate system. The estimated coordinate position thus comprises a general location on the slide 350 at which an automatic search for the selected first object of interest can begin.

According to one advantageous aspect of the present invention, the image of the FOV at the estimated coordinate position is compared with the stored image of the first object of interest, using a correlation method, as described further herein, so as to determine whether the selected first object of interest is within the FOV image at the estimated coordinate position. Such a correlation of the images may be accomplished, for example, in a space domain or in a frequency domain. The frequency domain method uses a Fast Fourier Transform ("FFT") procedure, while the space domain method uses a convolution procedure to perform the correlation. For gray level images, such correlation is based on the gray level value of the pixels in the respective images. For RGB images, such correlation may be based on, for example, the luminance of each pixel, the average of red, green and blue intensities, or a single color channel, in the respective images. In some instances, a particular combination of the three colors (RGB) resulting from a chromogen separation technique (Such techniques are discussed in more detail, for example, in U.S. Patent Application Publication Nos. US 2003/0091221 A1 (Method for quantitative video-microscopy and associated system and computer software program product) and US 2003/0138140A1 (Method for quantitative video-microscopy and associated system and computer software program product), both to Marcelpoil et al. and assigned to the assignee of the present invention, the contents of which are incorporated herein by reference in their entirety.) may also be used as a base value for correlation between the respective images. That is, for such correlation, particular characteristics of the selected first object of interest are determined and then the FOV image at the estimated coordinate position is analyzed to determine whether those particular characteristics are present in the FOV image.

Such a correlation procedure may be illustrated by a correlation coefficient for the two images, which is defined as:

$$\rho = \frac{\sigma_{1,2}}{\sqrt{\sigma_1 \sigma_2}}$$

where $\sigma_1$ is the standard deviation of the selected base values of Image 1 (i.e., the image of the selected first object of interest) and $\sigma_2$ is the standard deviation of the corresponding base values of Image 2 (i.e., the FOV image). $\sigma_{1,2}$ is the standard deviation of the product of the base values of Images 1 and 2.

With the frequency domain method, both images are transformed into the frequency domain using FFT so as to form respective transformed two-dimensional data sets or matrices. That is, the transformed two-dimensional data sets comprise matrices of complex numbers, with the matrices having the same dimensions as the original images (in matrix form). The transformed two-dimensional data sets of the respective images are then multiplied element by element to form a resultant two-dimensional data object. A vector from the center value (i.e., the center of the resultant two-dimensional object) to the highest absolute value of the resultant two-dimensional data object thus represents the displacement of the two images in terms of distance and direction. When using the frequency domain method, however, the respective images should have, for example, equal x and y dimensions, wherein each image dimension should be a power of two (i.e., 64, 128, 512, . . . ). Using this method, the required time to determine the displacement or offset depends only on the size (dimension, pixels, etc.) of the two respective images, and does not depend upon the actual content thereof. In this method, an actual value of the correlation coefficient is not known or determined, with only the point of highest correlation resulting from the analysis.

Using the space domain method, Image 1 is first shifted in both the x and y directions, and the correlation coefficients with respect to Image 2 then determined as a function of the displacement vector (x,y). The x and y values of the highest correlation coefficient found in such a process are then used as the displacement of Image 1 with respect to Image 2, if the correlation coefficient is above a preset threshold. If the correlation coefficient is below that threshold, the respective images cannot be matched and such a result indicates that the selected first object of interest has not been located within the FOV image.

With the space domain method as described, however, analyzing large images with all possible x and y combinations therein may be a time-consuming operation, which may, in some instances, be accelerated by the following iteratively repeated procedure:

1. Correlate the two images with starting point D(x,y) with a limited range R(x,y) using only every $N_x$th and $N_y$th pixel. Initially, the starting point D(x,y) is set to the center of Image 1 and the range R(x,y) is set to the full image.

2. Use the point with the highest correlation as a new starting point. Set the search range R(x,y) to ($\pm N_x, \pm N_y$). Use $$\frac{N_x}{2} \text{ and } \frac{N_y}{2}$$

as new values for $N_x$ and $N_y$.

3. Repeat until $N_x$ and $N_y$ equals 1.

If the resulting correlation coefficient is above a preset threshold (for example, 0.9), the selected first object of interest is determined to be within the FOV image and a resulting offset can be determined. However, if the correlation coefficient is below that threshold, the respective images cannot be matched and such a result indicates that the selected first object of interest has not been located within the FOV image.

Using either the frequency domain method or the space domain method in the above-described manner, particular fiducials or other precisely-known re-location marks on the slide 350 are not required. Further, if the stored images of the objects of interest were captured (scanned) using a different magnification from the active microscope magnification used by the system 50, the larger of the two magnifications is scaled so as to correspond to the magnification of the lesser-magnified image prior to the correlation procedure.

Figure 3:
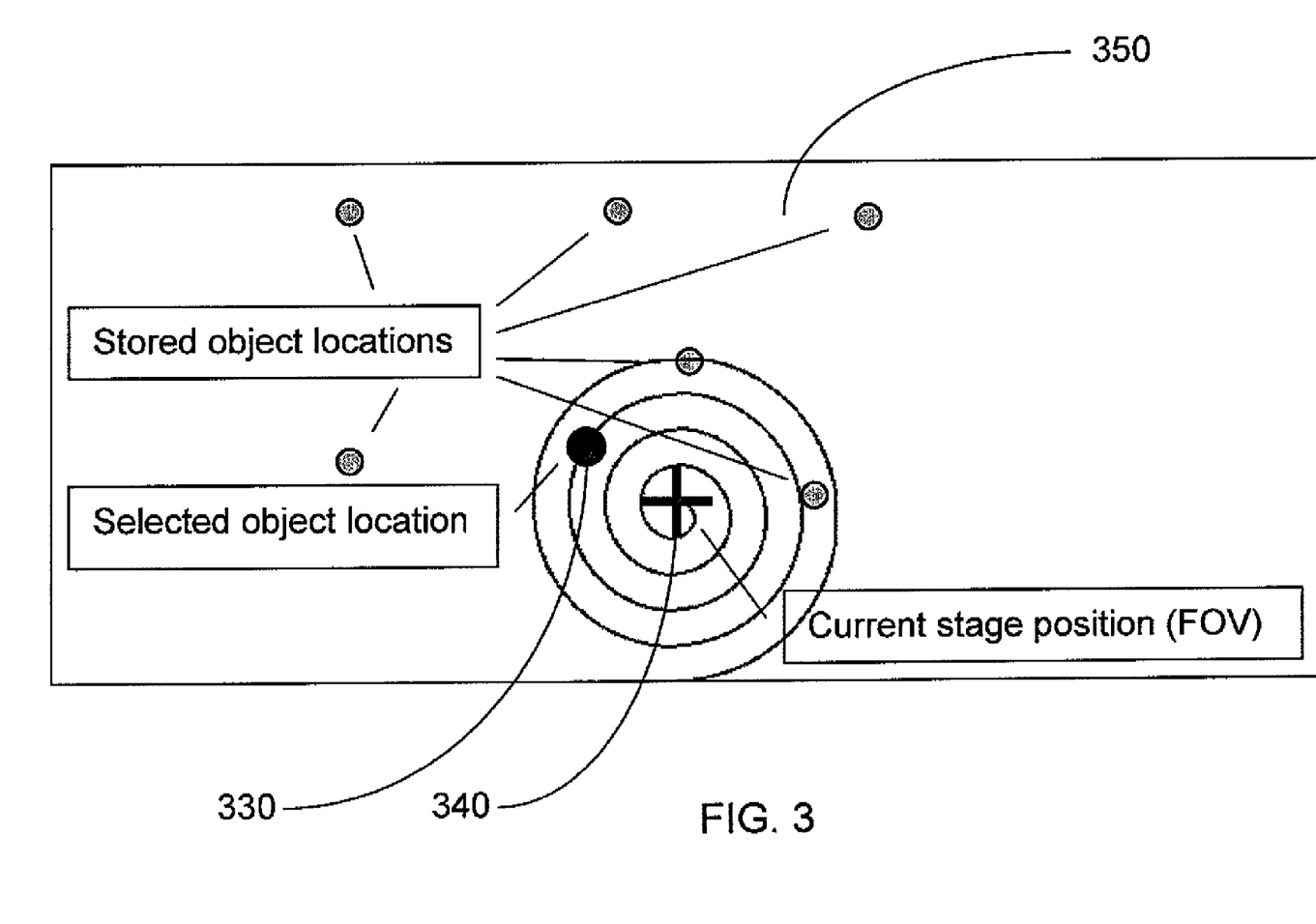
FIG. 3 schematically illustrates a stage being automatically moved in a spiral manner around an original estimated coordinate position so as to further search for an object of interest, according to one embodiment of the present invention, if the object of interest is not found in an FOV image.

If the first object of interest 330 is not found in the FOV image 340 by either the frequency domain method or the space domain method in the above-described correlation procedure, the stage 150 (motorized and configured to be controlled by the computer device 300) may then be automatically moved in a circular manner around the original estimated coordinate position so as to further search for the first object of interest 330, as shown, for example, in FIG. 3. That is, the stage 150 is configured to be responsive to the computer device 300 such that, if the first object of interest 330 is not found in the FOV image 340 at the estimated coordinate position, the stage 150 moves the slide 350 such that the camera device 200 captures successive FOV images in a circle pattern about the estimated coordinate position, while each successive FOV image is subject to the correlation procedure to determine whether that FOV image includes the first object of interest. The radius of the search circle is successively increased (i.e., in a spiral manner) thereafter until the first object of interest is located in a particular FOV image. If the first object of interest is not found in the FOV image and the stage 150 is configured to be manually operated, the operator then manually moves the stage 150 to a position outside the FOV at the estimated coordinate position such that subsequent FOV images can be searched for the first object of interest using the correlation procedure as previously described.

When the first object of interest is re-located on the slide 350, the offset between the stored coordinates (in the scan coordinate system) and actual coordinates on the slide 350 at which the first object of interest is re-located, is recorded and stored. The first object of interest is then centered in the field of view so as to allow further examination by the operator. Once the selected first object of interest has been located on the slide 350, the operator can select a second object of interest from the previously-scanned images of the objects of interest associated with that slide 350 displayed alongside the FOV image (now having the first object of interest in the center of the FOV) on the visual display, or otherwise visually provided to the operator. Since the actual coordinates of the first object of interest are now known with respect to both the stage coordinate system and the scan coordinate system, location of the second object of interest involves an appropriate calculation of the relative location of the second object of interest with respect to the first object of interest in the scan coordinate system, and corresponding displacement of the stage 150/slide 350 in the stage coordinate system. Once at the calculated location of the second object of interest, the correlation method(s) previously described can again be used to verify the actual location of the second object of interest. Knowing the actual location of the second object of interest (or any other subsequent selections of objects of interest) allows the offset to be refined by the computer device 300. In addition, by knowing the actual coordinates of the first and second objects of interest, the computer device 300 may also determine any rotation of the slide 350 in the stage coordinate system with respect to the stored coordinates in the scan coordinate system, thereby further improving the precision of the re-location of other objects of interest in the sample on the slide 350.

Figure 4:
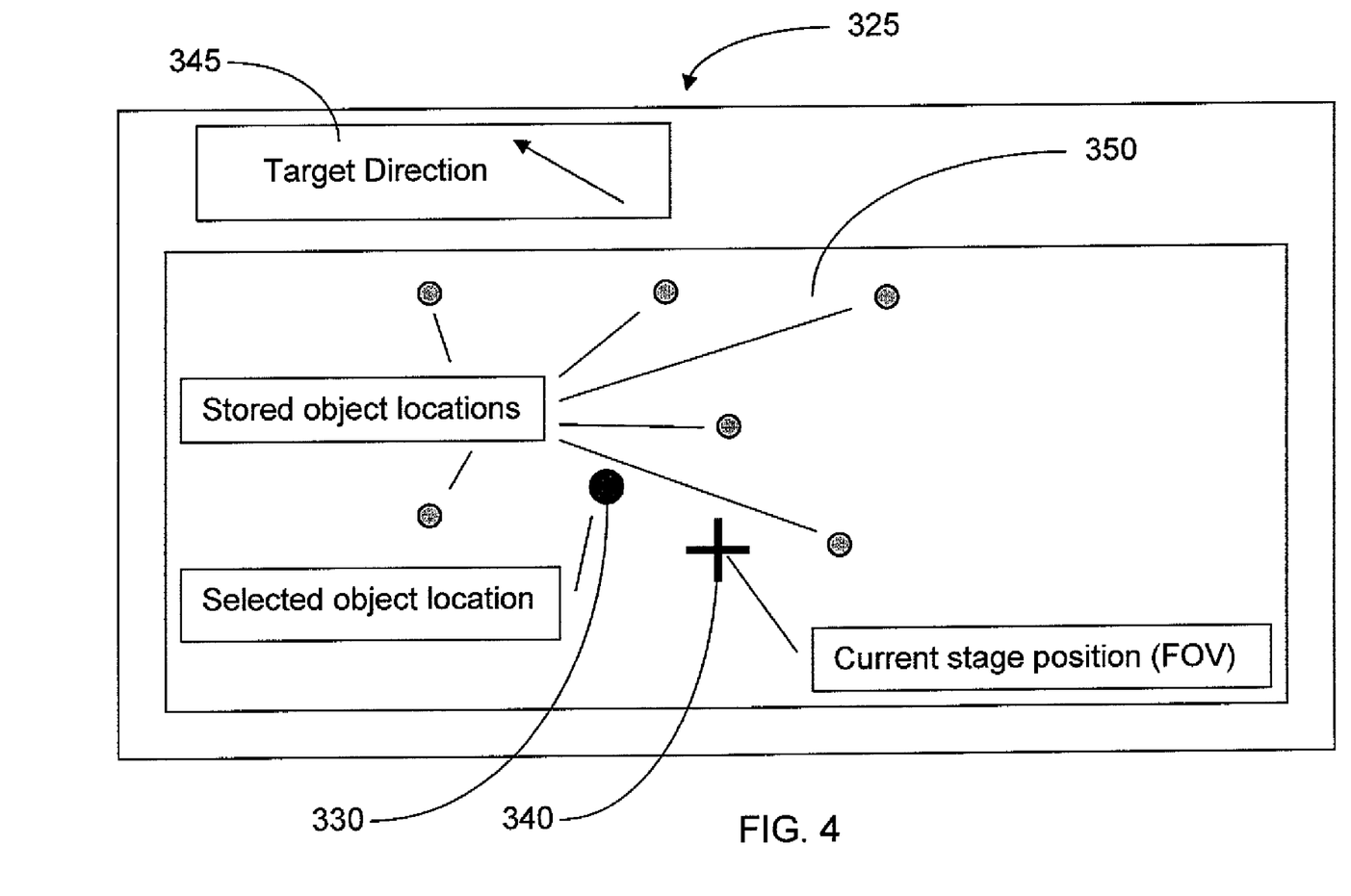
FIG. 4 schematically illustrates a visual display of previously-scanned objects of interest disposed with respect to each other, showing a selected object of interest and a current location of the field of view of the microscope with respect to the selected object of interest and the other objects of interest on the slide, according to one embodiment of the present invention.

In instances where the system 50 is configured such that the stage 150 is manually operated, embodiments of the present invention may also provide guidance to the operator in locating the selected object(s) of interest through, for example, directional instructions 345 regarding the movement of the stage 150 visually presented to the operator on the visual display 325 (i.e., visual aids for manually positioning the stage 150 with respect to the object(s) of interest). One skilled in the art will appreciate, however, that such instructions may be provided in different manners, such as aurally, or through text messages viewed on a separate display. In one instance, such as shown in FIG. 4, an image of the entire slide 350 is displayed on the visual display 325, showing the previously-scanned objects of interest with respect to each other. At the same time, an indicator of the estimated coordinate position of the current FOV 340 with respect to the slide 350 is also shown on the visual display 325. That is, in this manner, the system 50 provides a visual indicator of the as-scanned objects of interest along with an estimation of the locations of those objects of interest on the slide being viewed. Upon selection by the operator of the first object of interest 330, both the first object of interest 330 and the estimated coordinate position of the FOV are highlighted or otherwise clearly marked on the visual display 325.

With the difference between the estimated coordinate position of the FOV and the first object of interest being provided on the visual display 325, the operator then manually moves the stage 150 towards the visually-indicated location of the first object of interest in the whole-slide image shown on the visual display 325, with any necessary guidance being provided by the system 50 via the computer device 300, and the changing coordinate position of the FOV being continuously updated on the visual display 325. The correlation procedure can be run continuously as the stage 150 is being moved by the operator or, in the alternative, the correlation procedure can be invoked when movement of the stage 150 has stopped. The guidance to the operator for moving the stage 150 thus continues until the computer device 300 determines that the first object of interest is located within the center of the FOV displayed on the visual display 325. When the first object of interest is actually located on the slide 350, the offset, between the stored coordinates of the previously-scanned first object of interest in the scan coordinate system and the actual coordinates of the first object of interest located on the slide 350 in the stage coordinate system, is recorded and a guidance indicator such as, for example, a crosshair cursor or other suitable indicator for indicating the location of the desired first object of interest is overlaid or otherwise associated with a real-time image of the slide 350 or FOV so as to provide an indicator of the first object of interest on the actual slide 350. Subsequent selections of objects of interest will thus refine the offset, as previously discussed, as well as correct any rotation of the stage coordinate system with respect to the scan coordinate system, thereby improving the precision of the object of interest re-location process.

Embodiments of the present invention thus improve and facilitate workflow, speed, and precision in a microscope imaging system where an operator needs to re-examine a previously scanned and imaged slide. Such embodiments may also reduce equipment costs and/or provide other cost efficiencies in a microscope imaging system and related applications. More particularly, embodiments of the present invention, particularly the re-location aspects thereof, do not require special slides, and the required precision and reproducibility of the motorized stage of the microscope device is low to moderate whether the microscope device is used in the scanning phase or the re-location phase, as discussed herein. Further, no set-up procedure or calibration procedure is required for each individual slide to be examined. Instead, only the microscope stage requires calibration, which may be performed at various intervals, such as once per day or once per batch examination procedure. Further, once calibrated, the motorized stage does not require any particular set-up procedure prior to receiving slides for examination.

With the re-location procedure(s) disclosed herein, the risk of a substandard or inaccurate re-location of an object of interest is greatly reduced since correlation procedures are performed on a per pixel basis in a high resolution space. In addition, the re-location procedure(s) are configured to automatically re-locate the desired object of interest, and even consider differences in magnification in the process. Any of the located objects of interest are also automatically centered in the microscopic field of view to aid the operator in the analysis. The system is also configured to continuously update re-location parameters such that re-location precision and efficiency will increase as more objects of interest on that slide are examined by the operator. In addition, re-location precision can be improved by decreasing the minimum step size of the stage of the slide-reviewing device and may, for example, allow precise pixel-level re-location of an object of interest if the stage step size resolution is sufficiently high.

Many modifications and other embodiments of the inventions set forth herein will come to mind to one skilled in the art to which these inventions pertain having the benefit of the teachings presented in the foregoing descriptions and the associated drawings. For example, the methods disclosed herein with respect to re-locating an object on a slide may, in some instances, be alternatively accomplished where the microscope 100 is not equipped with a camera device 200. In such instances, the microscope 100 includes a motorized, encoded stage 150, as previously described, capable of being manually positioned, as well as controlled by the computer device 300. The stage 150 is additionally configured to be in communication with the computer device 300 such that the current position of the stage 150 can be reported to the computer device 300. For the previously-scanned slide 350, the computer device 300 includes coordinates, such as Cartesian coordinates or any other suitable coordinates, for any previously-identified objects of interest with respect to a reference point on the slide 350, wherein the reference point may be defined by any suitable point on the slide 350 such as, for example, one of the slide corners or any other precise, well defined fiducial on slide 350. According to such an alternative method, cross-correlation cannot be used since live images of the slide 350 are not available due to the lack of a camera device 200. As such, the slide 350 is first placed on the microscope stage 150 and the first target object of interest is selected on visual display 325 associated with the computer device 300. The computer device 300 then directs the stage 150 to move to the estimated coordinate position of the first target object of interest, as previously discussed. Once at the estimated coordinate position, the operator is directed to manually locate the first target object of interest by comparing the FOV of the microscopic 100 with the image of the first target object of interest on the visual display 325. When the first target object of interest is identified by the operator, the first target object of interest is centered in the FOV of the microscopic 100 by the operator. In some instances, the operator may also indicate to the computer device 300 when the first object of interest is centered in the FOV of the microscope 100 so as to facilitate initiation of subsequent steps to be performed by the computer device 300. The actual coordinates of the first target object of interest with respect to the stage 150 are also stored by the computer device 300, and an offset between the stored actual coordinates of the first target object of interest and the stored coordinates of the first target object of interest from the previous scan (i.e., in the scan coordinate system) is also calculated by the computer device 300.

The operator then selects the next or second target object of interest from the previously stored images of the objects of interest associated with that slide 350 displayed alongside the FOV image (now having the first object of interest in the center of the FOV) on the visual display 325. Since the actual coordinates of the first object of interest are now known with respect to both the stage coordinate system and the scan coordinate system, location of the second object of interest involves an appropriate calculation of the relative location of the second object of interest with respect to the first object of interest in the scan coordinate system, and corresponding displacement of the stage 150/slide 350 in the stage coordinate system. Once at the calculated location of the second object of interest, the operator must again manually locate the second target object of interest by comparing the FOV of the microscopic 100 with the image of the second target object of interest on the visual display 325. Again, once found and centered in the FOV of the microscope 100, the actual coordinates (in the stage coordinate system) of the second object of interest are stored by the computer device 300. Knowing the actual location of the second object of interest (or any other subsequent selections of objects of interest) allows the offset to be refined by the computer device 300. In addition, by knowing the actual coordinates of the first and second objects of interest, the computer device 300 may also determine any rotation of the slide 350 in the stage coordinate system with respect to the stored coordinates in the scan coordinate system. If necessary, the stage coordinate system can be refined, for example, by selectively removing outlier coordinates of objects of interest and/or by averaging or other error-minimizing techniques, as new coordinates of selected objects of interest are determined and stored.

In addition, further functionality may be associated with the apparatuses, systems, and methods disclosed herein. For instance, should the operator find an object of interest on the slide 350 during a manual search of the slide 350 through the microscope 100, and that object of interest is not the current selected target object of interest, the computer device 300 may be configured to identify that object of interest from the previous scan of the slide 350 by, for example, associating the location of the stage 150 to the scan coordinate system (in consideration of any identified offset, if already calculated) and identifying that object of interest from the database and/or the previously stored images of the objects of interest associated with that slide 350 displayed on the visual display 325. Accordingly, such a method may be advantageous in re-locating objects on a slide 350 using a less-expensive workstation that is not equipped with a camera device 200.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of re-locating an object of interest in a sample on a slide as viewed through a microscope objective, comprising:
   scanning the slide so as to determine objects of interest in the sample, associating corresponding coordinates with each object of interest, and storing an image and corresponding coordinates of each object of interest;
   mapping the objects of interest relative to each other via the coordinates;
   positioning the slide on a microscope stage;
   displaying the stored images of the objects of interest on a visual display;
   selecting a single first target object of interest from the displayed stored images of the objects of interest;
   moving the slide, via the microscope stage, to a first estimated coordinate position on the slide corresponding to the stored coordinates of the single first target object of interest;
   capturing a field-of-view image of the sample at the first estimated coordinate position through the microscope objective, the field-of-view image being displayed separately from the displayed stored images;
comparing the field-of-view image to the stored image of the single first target object of interest while the field-of-view image and the stored image are not in superposition with one another and, if the single first target object of interest is located in the field-of-view image, determining a first offset between actual coordinates of the located single first target object of interest and the stored coordinates of the object of interest corresponding to the single first target object of interest; and
moving the slide, via the microscope stage, from the first estimated coordinate position and according to the first offset so as to center the single first target object of interest in the field-of-view image.

2. A method according to claim 1 further comprising determining a stage coordinate system associated with placement of the slide on and movement of the microscope stage, following positioning the slide on the microscope stage.

3. A method according to claim 2 wherein moving the slide, via the microscope stage, to a first estimated coordinate position on the slide further comprises moving the slide to a first estimated coordinate position on the slide, the first estimated coordinate position corresponding to the coordinates of the single first target object of interest translated to the stage coordinate system.

4. A method according to claim 1 wherein comparing the field-of-view image to the stored image of the single first target object of interest further comprises comparing the field-of-view image to the stored image of the single first target object of interest using one of a manual identification procedure and a correlation procedure.

5. A method according to claim 4 wherein comparing the field-of-view image to the stored image of the single first target object of interest using a correlation procedure further comprises comparing the field-of-view image to the stored image of the single first target object of interest using one of a space domain correlation procedure and a frequency domain correlation procedure.

6. A method according to claim 4 wherein comparing the field-of-view image to the stored image of the single first target object of interest using a correlation procedure further comprises comparing the field-of-view image to the stored image of the single first target object of interest using one of a convolution correlation procedure and a Fast Fourier Transform correlation procedure.

7. A method according to claim 1 further comprising, if the single first target object of interest is not located in the field-of-view image, automatically moving the slide, via the microscope stage, in a successively increasing-radius circular motion around the estimated coordinate position while capturing additional field-of-view images, and searching for the single first target object of interest within each field-of-view image.

8. A method according to claim 1 further comprising, if the single first target object of interest is not located in the field-of-view image, manually moving the slide, via the microscope stage, while capturing additional field-of-view images and searching for the single first target object of interest within each field-of-view image.

9. A method according to claim 1 wherein moving the slide via the microscope stage further comprises at least one of manually moving and automatically moving the microscope stage so as to move the slide.

10. A method according to claim 9 wherein, when the microscope stage is manually moved, providing a directional instruction for manually moving the microscope stage toward the single first target object of interest, said directional instruction being selected from the group consisting of a visual indicia and an aural indicia.

11. A method according to claim 10 wherein providing a visual directional indicia further comprises providing at least one of an alphanumeric indicia and a character indicia relating the field-of-view image to the first estimated coordinate position of the single first target object of interest.

12. A method according to claim 1 further comprising:
selecting a second target object of interest from the displayed stored images of the objects of interest;
locating the second target object of interest on the slide relative to the single first target object of interest using at least one of the map of the objects of interest relative to each other and the first offset with respect to the stored coordinates of the object of interest corresponding to the second object of interest; and
determining a second offset between actual coordinates of the located second target object of interest and the stored coordinates of the object of interest corresponding to the second target object of interest.

13. A method according to claim 12 wherein locating the second target object of interest further comprises comparing the field-of-view image of a second estimated coordinate position on the slide, corresponding to the coordinates of the second target of interest, to the stored image of the second target object of interest, to determine if the second target object of interest is located in the field-of-view image.

14. A method according to claim 12 further comprising comparing the first offset to the second offset so as to verify the actual coordinates of the single first target object of interest relative to the actual coordinates of the second target object of interest, and with respect to the corresponding mapped objects of interest.

15. A method according to claim 12 further comprising determining a rotation of the slide with respect to the mapped objects of interest by comparing the actual coordinates of the single first target object of interest and the second target object of interest to the corresponding mapped objects of interest.

16. A method of re-locating an object of interest in a sample on a slide on a microscope stage, the slide having been previously scanned so as to determine objects of interest in the sample, wherein corresponding coordinates have been associated with each object of interest, an image and corresponding coordinates of each object of interest have been stored, and the objects of interest mapped relative to each other via the coordinates, said method comprising:
displaying the stored images of the objects of interest on a visual display;
selecting a single first target object of interest from the displayed stored images of the objects of interest;
moving the slide, via the microscope stage, to a first estimated coordinate position on the slide corresponding to the stored coordinates of the single first target object of interest;
capturing a field-of-view image of the sample at the first estimated coordinate position through a microscope objective, the field-of-view image being displayed separately from the displayed stored images;
comparing the field-of-view image to the stored image of the single first target object of interest while the field-of-view image and the stored image are not in superposition with one another and, if the single first target object of interest is located in the field-of-view image, determining a first offset between actual coordinates of the located single first target object of interest and the stored coordinates of the object of interest corresponding to the single first target object of interest; and moving the slide, via the microscope stage, from the first estimated coordinate position and according to the first offset so as to center the single first target object of interest in the field-of-view image.

17. A method according to claim 16 further comprising determining a stage coordinate system associated with placement of the slide on and movement of the microscope stage, following positioning the slide on the microscope stage.

18. A method according to claim 17 wherein moving the slide, via the microscope stage, to a first estimated coordinate position on the slide further comprises moving the slide to a first estimated coordinate position on the slide, the first estimated coordinate position corresponding to the coordinates of the single first target object of interest translated to the stage coordinate system.

19. A method according to claim 16 wherein comparing the field-of-view image to the stored image of the single first target object of interest further comprises comparing the field-of-view image to the stored image of the single first target object of interest using one of a manual identification procedure and a correlation procedure.

20. A method according to claim 19 wherein comparing the field-of-view image to the stored image of the single first target object of interest using a correlation procedure further comprises comparing the field-of-view image to the stored image of the single first target object of interest using one of a space domain correlation procedure and a frequency domain correlation procedure.

21. A method according to claim 19 wherein comparing the field-of-view image to the stored image of the single first target object of interest using a correlation procedure further comprises comparing the field-of-view image to the stored image of the single first target object of interest using one of a convolution correlation procedure and a Fast Fourier Transform correlation procedure.

22. A method according to claim 16 further comprising, if the single first target object of interest is not located in the field-of-view image, automatically moving the slide, via the microscope stage, in a successively increasing-radius circular motion around the estimated coordinate position while capturing additional field-of-view images, and searching for the single first target object of interest within each field-of-view image.

23. A method according to claim 16 further comprising, if the single first target object of interest is not located in the field-of-view image, manually moving the slide, via the microscope stage, while capturing additional field-of-view images and searching for the single first target object of interest within each field-of-view image.

24. A method according to claim 16 wherein moving the slide via the microscope stage further comprises at least one of manually moving and automatically moving the microscope stage so as to move the slide.

25. A method according to claim 24 wherein, when the microscope stage is manually moved, providing a directional instruction for manually moving the microscope stage toward the single first target object of interest, said directional instruction being selected from the group consisting of a visual indicia and an aural indicia.

26. A method according to claim 25 wherein providing a visual directional indicia further comprises providing at least one of an alphanumeric indicia and a character indicia relating the field-of-view image to the first estimated coordinate position of the single first target object of interest.

27. A method according to claim 16 further comprising:
selecting a second target object of interest from the displayed stored images of the objects of interest;
locating the second target object of interest on the slide relative to the single first target object of interest using at least one of the map of the objects of interest relative to each other and the first offset with respect to the stored coordinates of the object of interest corresponding to the second object of interest; and
determining a second offset between actual coordinates of the located second target object of interest and the stored coordinates of the object of interest corresponding to the second target object of interest.

28. A method according to claim 27 wherein locating the second target object of interest further comprises comparing the field-of-view image of a second estimated coordinate position on the slide, corresponding to the coordinates of the second target of interest, to the stored image of the second target object of interest, to determine if the second target object of interest is located in the field-of-view image.

29. A method according to claim 27 further comprising comparing the first offset to the second offset so as to verify the actual coordinates of the single first target object of interest relative to the actual coordinates of the second target object of interest, and with respect to the corresponding mapped objects of interest.

30. A method according to claim 27 further comprising determining a rotation of the slide with respect to the mapped objects of interest by comparing the actual coordinates of the single first target object of interest and the second target object of interest to the corresponding mapped objects of interest.

31. A method of re-locating an object of interest in a sample on a slide on a microscope stage, the slide having been previously scanned so as to determine objects of interest in the sample, wherein corresponding coordinates have been associated with each object of interest, an image and corresponding coordinates of each object of interest have been stored, and the objects of interest mapped relative to each other via the coordinates, said method comprising:
displaying the stored images of the objects of interest on a visual display;
selecting a single first target object of interest from the displayed stored images of the objects of interest;
moving the slide, via the microscope stage, to a first estimated coordinate position on the slide corresponding to the stored coordinates of the single first target object of interest;
manually comparing a field-of-view image of the sample at the first estimated coordinate position viewed through a microscope objective to the stored image of the single first target object of interest while the field-of-view image and the stored image are not in superposition with one another and, if the single first target object of interest is located in the field-of-view image, determining a first offset between actual coordinates of the located single first target object of interest and the stored coordinates of the object of interest corresponding to the single first target object of interest, the field-of-view image being displayed separately from the displayed stored images; and
moving the slide, via the microscope stage, from the first estimated coordinate position and according to the first offset so as to center the single first target object of interest in the field-of-view image.

32. A method according to claim 31 further comprising determining a stage coordinate system associated with placement of the slide on and movement of the microscope stage, following positioning the slide on the microscope stage.

33. A method according to claim 32 wherein moving the slide, via the microscope stage, to a first estimated coordinate position on the slide further comprises moving the slide to a first estimated coordinate position on the slide, the first estimated coordinate position corresponding to the coordinates of the single first target object of interest translated to the stage coordinate system.

34. A method according to claim 31 wherein moving the slide via the microscope stage further comprises at least one of manually moving and automatically moving the microscope stage so as to move the slide.

35. A method according to claim 34 wherein, when the microscope stage is manually moved, providing a directional instruction for manually moving the microscope stage toward the single first target object of interest, said directional instruction being selected from the group consisting of a visual indicia and an aural indicia.

36. A method according to claim 35 wherein providing a visual directional indicia further comprises providing at least one of an alphanumeric indicia and a character indicia relating the field-of-view image to the first estimated coordinate position of the single first target object of interest.

37. A method according to claim 31 further comprising:
selecting a second target object of interest from the displayed stored images of the objects of interest;
moving the slide to a second estimated coordinate position of the second target object of interest using at least one of the map of the objects of interest relative to each other and the first offset with respect to the stored coordinates of the object of interest corresponding to the second object of interest; and
manually comparing a field-of-view image of the sample at the second estimated coordinate position viewed through the microscope objective to the stored image of the second target object of interest and, if the second target object of interest is located in the field-of-view image, determining a second offset between actual coordinates of the located second target object of interest and the stored coordinates of the object of interest corresponding to the second target object of interest.

38. A method according to claim 37 further comprising comparing the first offset to the second offset so as to verify the actual coordinates of the single first target object of interest relative to the actual coordinates of the second target object of interest, and with respect to the corresponding mapped objects of interest.

39. A method according to claim 37 further comprising determining a rotation of the slide with respect to the mapped objects of interest by comparing the actual coordinates of the single first target object of interest and the second target object of interest to the corresponding mapped objects of interest.

40. The method of claim 1, wherein comparing comprises comparing the field-of-view image to the stored image of the single first target object of interest to determine if quantifiable characteristics of the object interest in the first target object of interest are present in the field-of-view image.

* * * * *